United States Patent
Lampert

(10) Patent No.: US 8,266,344 B1
(45) Date of Patent: Sep. 11, 2012

(54) RECYCLING BUFFER POINTERS USING A PREFETCH BUFFER

(75) Inventor: Gerald Lampert, Hopkinton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 126 days.

(21) Appl. No.: 12/566,239

(22) Filed: Sep. 24, 2009

(51) Int. Cl.
*G06F 3/00* (2006.01)

(52) U.S. Cl. .......... 710/52; 710/8; 710/13; 710/17; 710/23; 710/33; 710/54; 710/56; 710/57; 710/62; 711/115; 711/147; 711/153

(58) Field of Classification Search ............... 710/8, 13, 710/17, 23, 33, 52, 54, 56, 57, 62; 711/115, 711/147, 153
See application file for complete search history.

(56) References Cited

U.S. PATENT DOCUMENTS

| | | | | |
|---|---|---|---|---|
| 6,393,548 | B1* | 5/2002 | Kerstein et al. | 712/43 |
| 7,853,760 | B2* | 12/2010 | Paladini et al. | 711/158 |
| 8,131,895 | B2* | 3/2012 | Pope et al. | 710/52 |
| 2002/0118882 | A1* | 8/2002 | Tezuka | 382/218 |
| 2003/0063562 | A1* | 4/2003 | Sarkinen et al. | 370/230 |
| 2005/0144341 | A1* | 6/2005 | Schmidt et al. | 710/52 |
| 2006/0101219 | A1* | 5/2006 | Mita et al. | 711/170 |
| 2007/0050536 | A1* | 3/2007 | Kolokowsky | 711/103 |

* cited by examiner

*Primary Examiner* — Chun-Kuan Lee
*Assistant Examiner* — Jasjit Vidwan
(74) *Attorney, Agent, or Firm* — Harrity & Harrity, LLP

(57) ABSTRACT

A network device may include an off-chip memory to store a free-list of buffer pointers. The network device may further include an on-chip controller that includes a prefetch buffer. The prefetch buffer may store unallocated buffer pointers that point to available memory locations in a different off-chip memory. The on-chip controller may receive an unallocated buffer pointer, determine, in response to receiving the unallocated buffer pointer, whether the prefetch buffer is full, store the unallocated buffer pointer in the prefetch buffer when the prefetch buffer is determined not to be full, and store the unallocated buffer pointer in the free-list, in the off-chip memory, when the prefetch buffer is determined to be full.

20 Claims, 8 Drawing Sheets

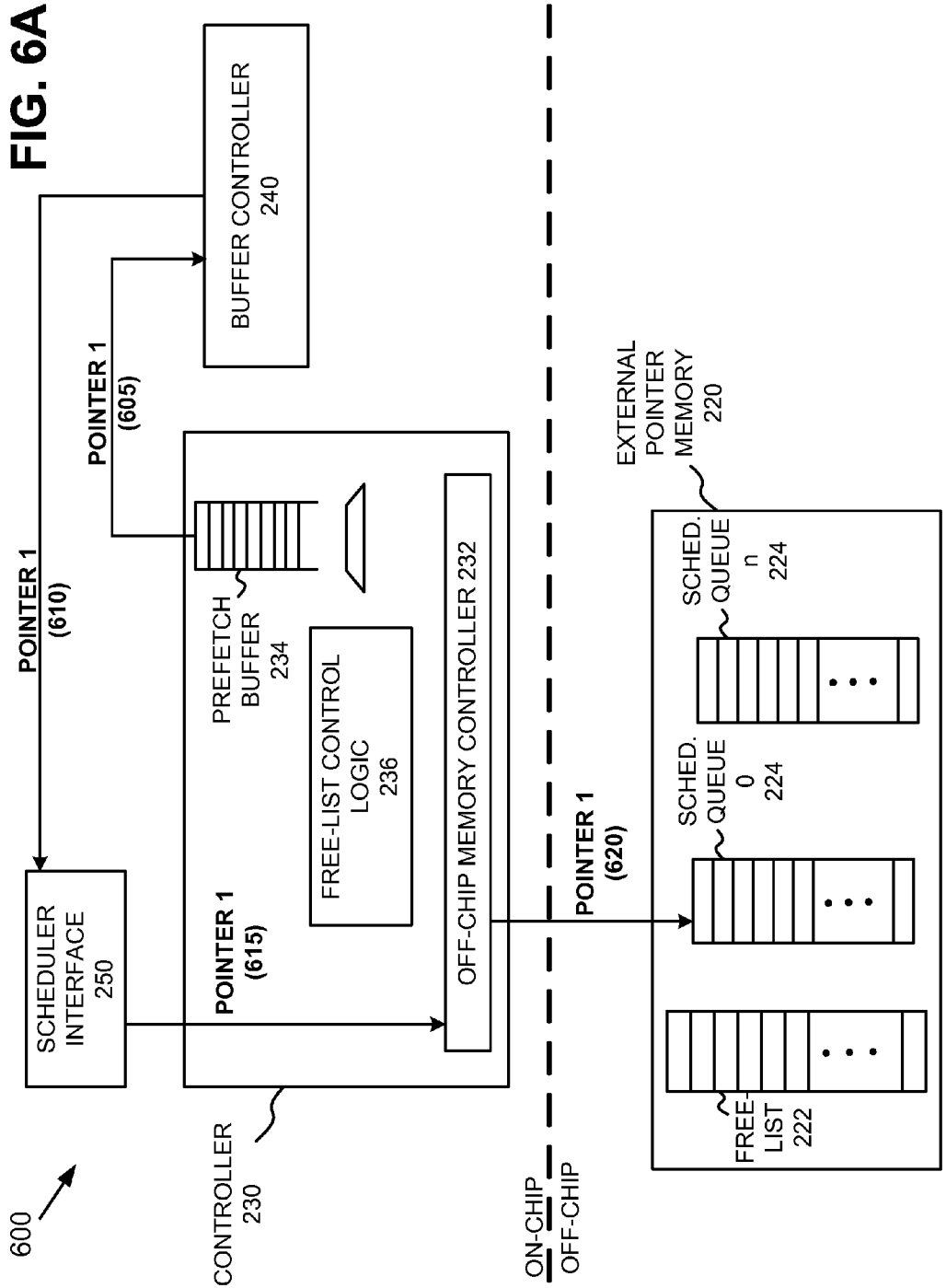

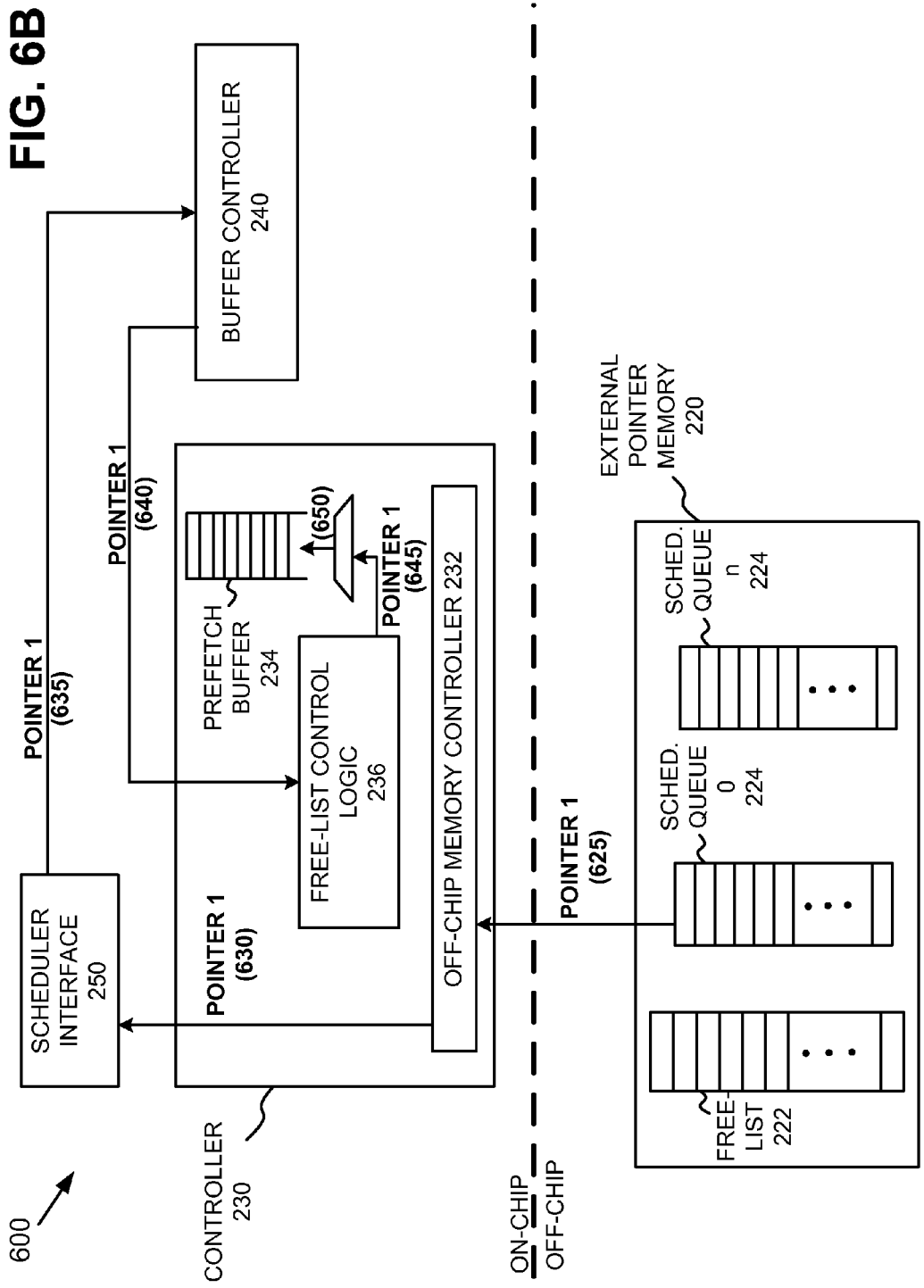

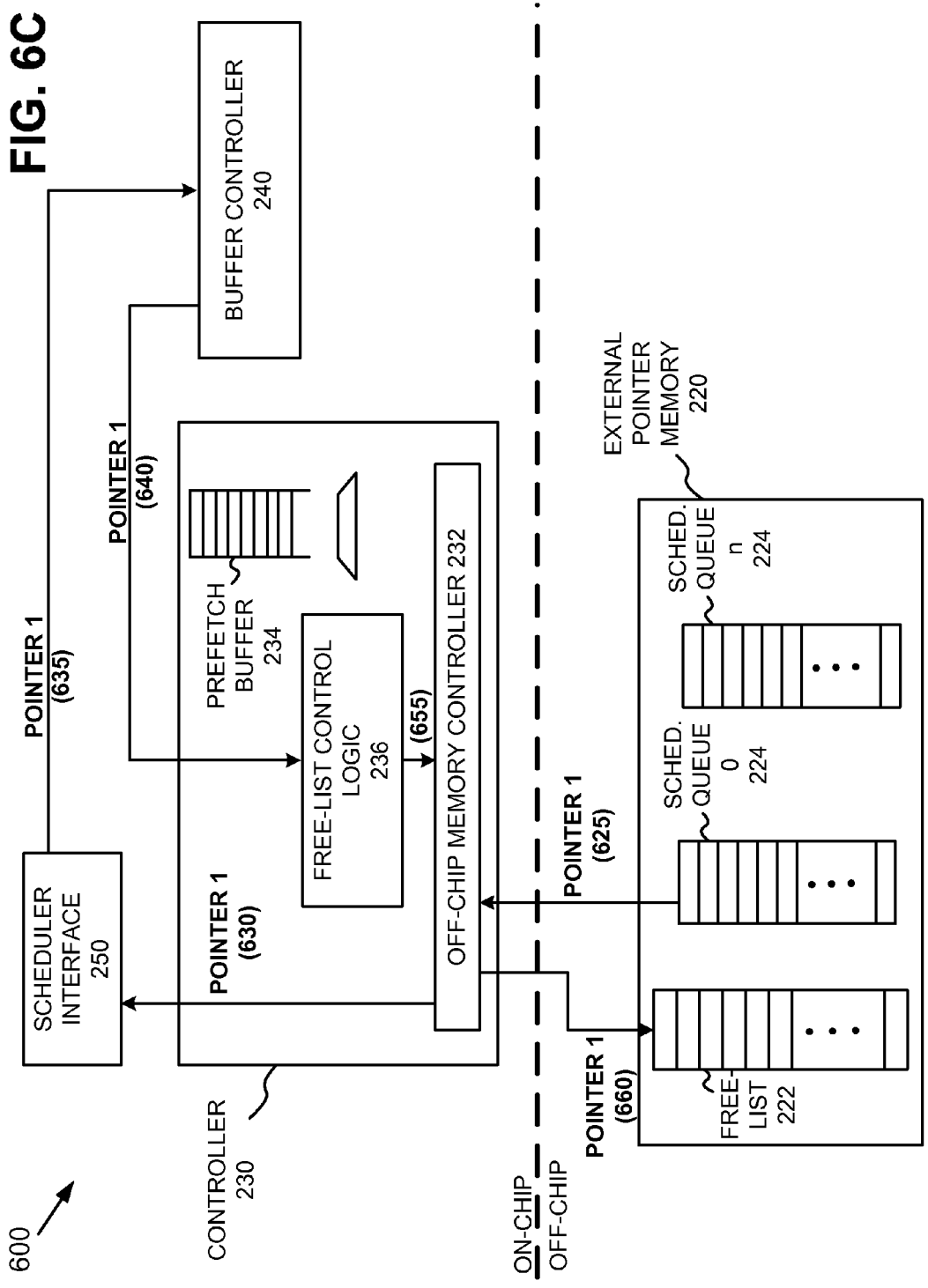

RECYCLING BUFFER POINTERS USING A PREFETCH BUFFER

BACKGROUND

The performance of managed lists that reside in external memory (e.g., of a network device, such as a router) are designed to handle worst-case performance requirements. When occasional bursts of increased demand on the list occur, the performance of the list is required to meet that demand. Even if this scenario is an uncommon event, the design of the list must handle those events, regardless of the cost of doing so. The cost is typically seen as either providing a more expensive memory solution (i.e., provide greater bandwidth) or reserving bandwidth to that memory system for contingency purposes, where that bandwidth would otherwise have been allocated to a different function.

SUMMARY

According to one aspect, a network device may include an off-chip memory to store a free-list of buffer pointers. The network device may further include an on-chip controller that includes a prefetch buffer. The prefetch buffer may store unallocated buffer pointers that point to available memory locations in a different off-chip memory. The on-chip controller may receive an unallocated buffer pointer, determine, in response to receiving the unallocated buffer pointer, whether the prefetch buffer is full, store the unallocated buffer pointer in the prefetch buffer when the prefetch buffer is determined not to be full, and store the unallocated buffer pointer in the free-list, in the off-chip memory, when the prefetch buffer is determined to be full.

According to another aspect, a method for managing buffer pointers that point to locations in an off-chip memory may be provided. The off-chip memory may store data units. The method may include receiving, by a controller, a buffer pointer; determining, by the controller and in response to receiving the buffer pointer, whether an on-chip prefetch buffer is full, where the on-chip prefetch buffer is to store buffer pointers; storing, by the controller, the buffer pointer in the on-chip prefetch buffer when the on-chip prefetch buffer is determined not to be full; and storing, by the controller, the buffer pointer in an off-chip buffer pointer memory when the on-chip prefetch buffer is determined to be full.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIGS. 6A-6C is an example of the processing described above with respect to FIGS. 4 and 5.

DETAILED DESCRIPTION

The following detailed description refers to the accompanying drawings. The same reference numbers in different drawings may identify the same or similar elements. Also, the following detailed description does not limit the invention.

Managing buffer pointer lists in relation to processing of data units (e.g., cells, packets, etc.) typically involves four operations: a supply operation (e.g., which may involve retrieving a buffer pointer from a free-list located in an off-chip memory), an enqueue operation (e.g., which may involve storing a buffer pointer in a queue located in the off-chip memory), a dequeue operation (e.g., which may involve retrieving a buffer pointer from a queue located in the off-chip memory), and a return operation (e.g., which may involve storing the buffer pointer to the free-list located in the off-chip memory). The supply and dequeue operations are off-chip memory read operations and the enqueue and return operations are off-chip memory write operations. Therefore, the memory interface is typically designed so that two off-chip memory read operations and two off-chip memory write operations may be performed in an allowable time period. In communication systems, this time period (referred to as "one epoch") is the time required to process one minimum-sized data unit.

Embodiments described herein may provide systems and/or methods for efficiently managing buffer pointer lists in network devices. In one embodiment, an on-chip prefetch buffer may be provided that allows for recycling of buffer pointers. Thus, when a buffer pointer is to be returned, instead of writing the buffer pointer back to the free-list in the off-chip memory, the buffer pointer may be stored in the on-chip prefetch buffer and used for a subsequently received data unit. By eliminating the off-chip supply and return operations and performing these operations on-chip, one less read and one less write operation can be performed to the off-chip memory during the processing of a data unit. As a result, the bandwidth requirement to the off-chip memory can be reduced. Additionally or alternatively, additional enqueue/dequeue operations may be performed in an epoch. For example, two enqueue operations and two dequeue operations may be performed in a single epoch.

Exemplary Device

Figure 1:
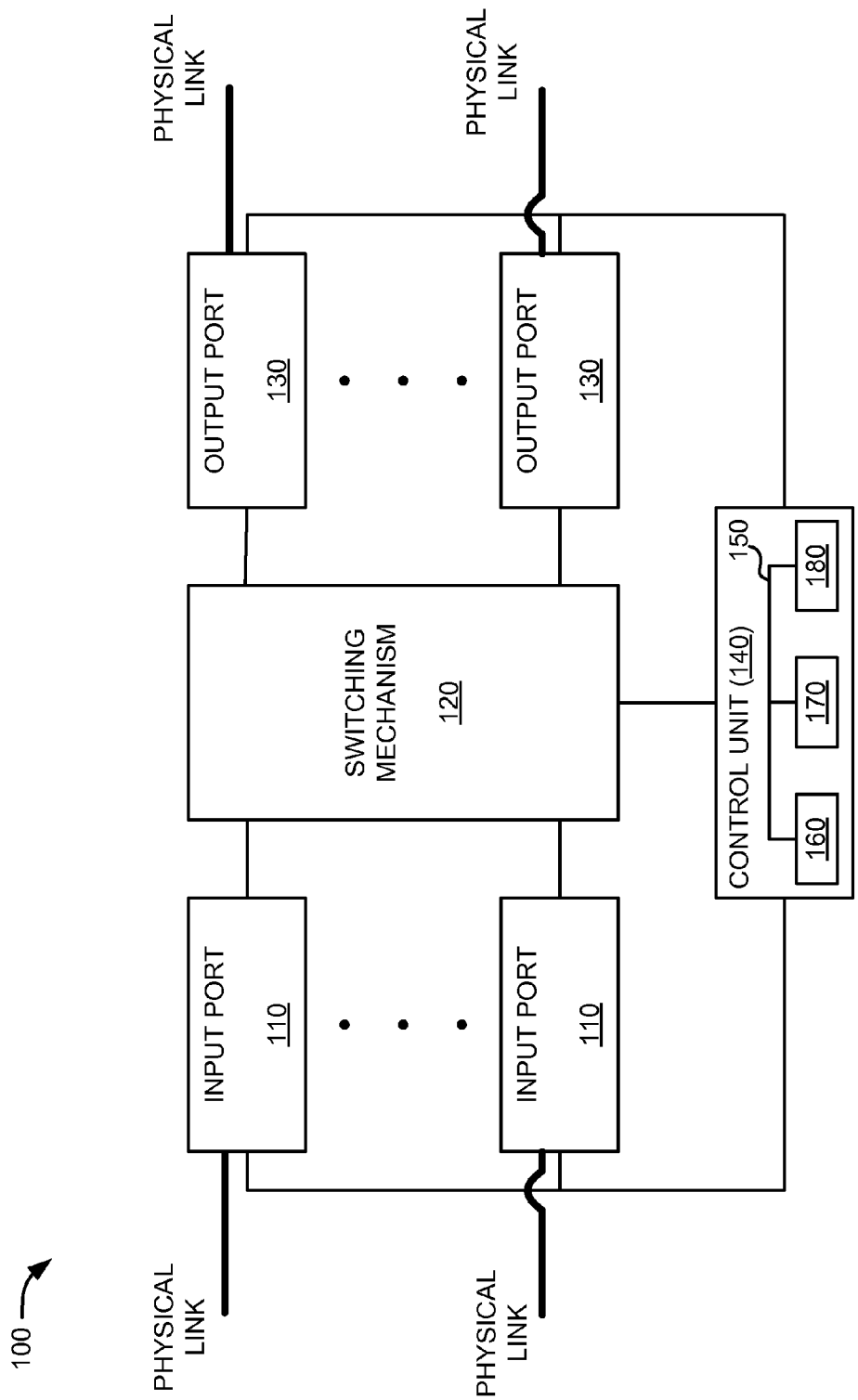
FIG. 1 is a block diagram illustrating exemplary components of a network device in which systems and/or methods, described herein, may be implemented.

FIG. 1 is a block diagram illustrating exemplary components of a network device 100 in which systems and/or methods, described herein, may be implemented. Network device 100 may include a data transfer device, such as a gateway, a router, a switch, a firewall, a network interface card (NIC), a hub, a bridge, a proxy server, an optical add-drop multiplexer (OADM), or some other type of device that processes and/or transfers traffic. As illustrated, network device 100 may include input ports 110, a switching mechanism 120, output ports 130, and a control unit 140.

Input ports 110 may be the point of attachment for a physical link and may be the point of entry for incoming traffic (e.g., data units). Input ports 110 may perform data link layer encapsulation and decapsulation. Input ports 110 may look up a destination address of incoming traffic in a forwarding table to determine its destination port (i.e., route lookup). In other implementations, input ports 110 may send (e.g., may be an exit point for) and/or receive (e.g., may be an entry point for) traffic. Input ports 110 may perform the above and other operations in response to a processor, located on input ports 110, executing a set of instructions. Additionally or alternatively, some or all of the above operations described herein as being performed by input ports 110 may be performed in hardware (e.g., via an application specific integrated circuit (ASIC), a field programmable gate array (FPGA), etc.).

Switching mechanism 120 may interconnect input ports 110 with output ports 130. Switching mechanism 120 may be implemented using many different techniques. For example, switching mechanism 120 may be implemented via busses, crossbars, and/or shared memories.

Output ports 130 may store traffic and may schedule traffic for service on an output link (e.g., a physical link). Output ports 130 may include scheduling algorithms that support priorities and guarantees. Output ports 130 may support data link layer encapsulation and decapsulation, and/or a variety of higher-level protocols. In other implementations, output ports 130 may send traffic (e.g., may be an exit point for) and/or receive (e.g., may be an entry point for) traffic. Output ports 130 may perform the above and other operations in response to a processor, located on output ports 130, executing a set of instructions. Additionally or alternatively, some or all of the above operations described herein as being performed by output ports 130 may be performed in hardware (e.g., via an ASIC, a FPGA, etc.).

Control unit 140 may use routing protocols and one or more forwarding tables for forwarding traffic. Control unit 140 may interconnect with input ports 110, switching mechanism 120, and output ports 130. Control unit 140 may compute a forwarding table, construct a link state database (LSDB), implement routing protocols, and/or run software to configure and manage network device 100. Control unit 140 may handle any traffic whose destination address may not be found in the forwarding table. In some implementations, control unit 140 may communicate with an external network management system or operation support system and may perform provisioning, configuration, reporting, and/or maintenance functions for network device 100.

In one exemplary embodiment, control unit 140 may include a bus 150 that may include a path that permits communication among a processor 160, a memory 170, and a communication interface 180. Processor 160 may include one or more processors, microprocessors, or other types of processing units, such as ASICs, FPGAs, etc., that may interpret and execute instructions. Memory 170 may include a random access memory (RAM), a read only memory (ROM) device, a magnetic and/or optical recording medium and its corresponding drive, and/or another type of static and/or dynamic storage device that may store information and/or instructions for execution by processor 160. For example, memory 170 may include a LSDB, routing tables, etc. Communication interface 180 may include any transceiver-like mechanism that enables control unit 140 to communicate with other devices and/or systems.

Network device 100 may perform certain operations and implement certain functions, as described in detail below. Network device 100 may perform these operations and implement certain functions in response to processor 160 executing software instructions contained in a computer-readable medium, such as memory 170. A computer-readable medium may be defined as a physical or logical memory device. A logical memory device may include memory space within a single physical memory device or spread across multiple physical memory devices. The software instructions may be read into memory 170 from another computer-readable medium, such as a data storage device, or from another device via communication interface 180. The software instructions contained in memory 170 may cause processor 160 to perform processes that will be described later. Alternatively, hardwired circuitry may be used in place of or in combination with software instructions to implement processes described herein. Thus, embodiments described herein are not limited to any specific combination of hardware circuitry and software.

Although FIG. 1 shows exemplary components of network device 100, in other embodiments, network device 100 may include fewer, different, differently arranged, or additional components than depicted in FIG. 1. In some embodiments, one or more components of network device 100 may perform one or more other tasks described as being performed by one or more other components of network device 100.

Figure 2:
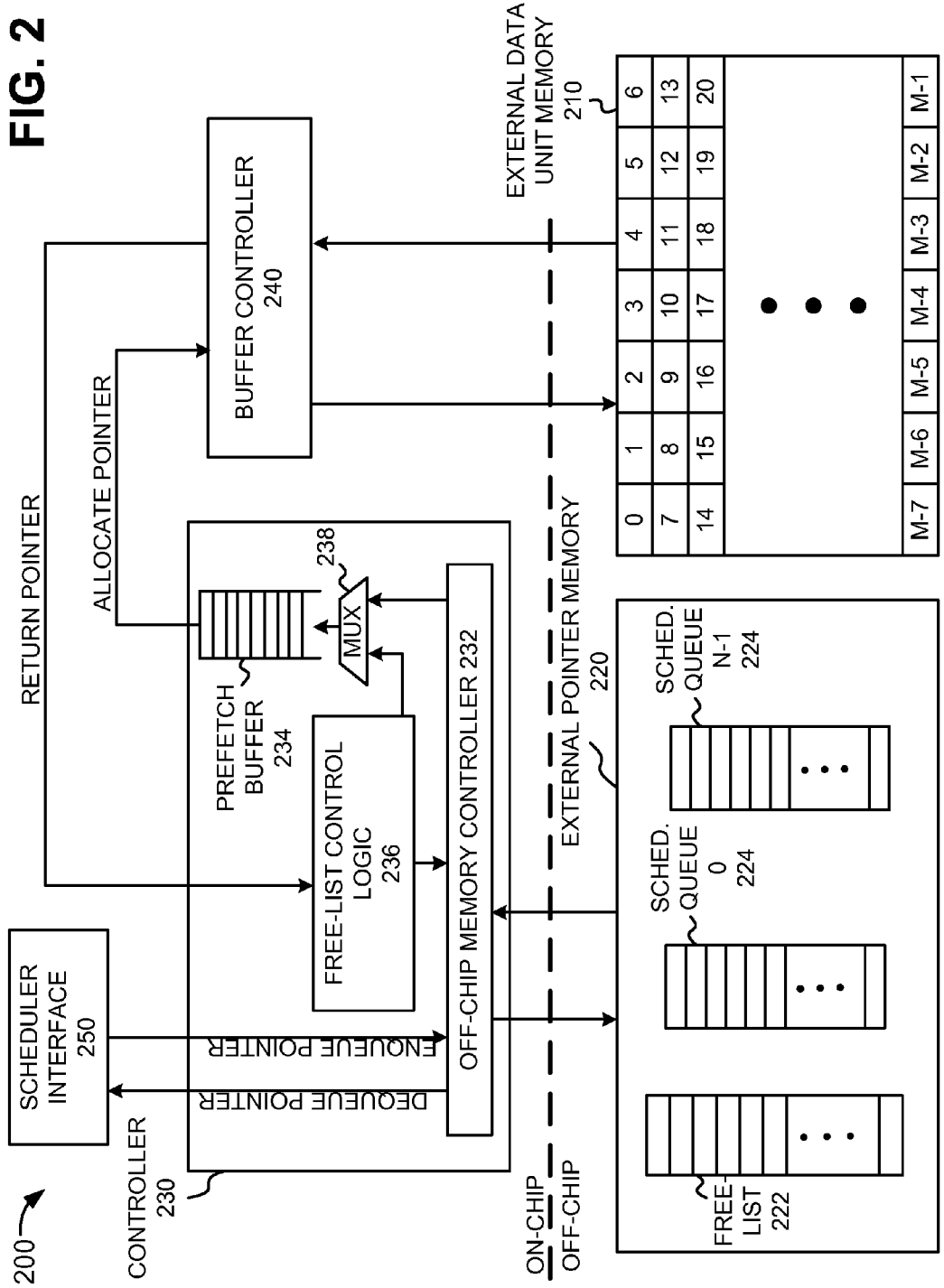
FIG. 2 is a block diagram illustrating exemplary components of a portion of the network device of FIG. 1.

FIG. 2 is a block diagram illustrating exemplary components of a portion 200 of network device 100. In one embodiment, portion 200 may be implemented in an input port 110, an output port 130, and/or control unit 140. As illustrated, portion 200 may include an on-chip portion and an off-chip portion.

The off-chip portion may include an external data unit memory 210 and an external pointer memory 220. External data unit memory 210 may store data units (e.g., cells, packets, etc.) for network device 100. In one implementation, external memory 210 may be partitioned into M individual buffers (labeled as 0 to M−1), where M is a positive integer that is greater than one. In one embodiment, M may be an integer in the thousands, millions, or more. Each buffer, in external data unit memory 210, may store a data unit or a portion of a data unit. In one embodiment, each buffer may be 128 bytes.

External pointer memory 220 may store the buffer pointers that point to the buffers of external data unit memory 210. External pointer memory 220 may include a free-list 222 and a group of N scheduler queues 224, where N is a positive integer greater than one. Free-list 222 may store a list of buffer pointers for available buffers in external data unit memory 210 (i.e., buffers that are available to store data units). Thus, when external data unit memory 210 does not store any data units, free-list 222 may store the entire list of buffer pointers. Thus, free-list 222 may be capable of storing a buffer pointer for each buffer in external data unit memory 210. Each buffer pointer stored in free-list 222 may point to the next location on the list. Thus, for example, entry 0 of free-list 222 may point to entry 1, entry 1 of free-list 222 may point to entry 2, entry 2 of free-list 222 may point to entry 3, etc. In one embodiment, free-list 222 may include entries that are wide enough to at least store a buffer pointer (e.g., 20 bits).

Scheduler queues 224 may store buffer pointers for buffers, from external data unit memory 210, that store data units. Thus, for any given instant in time, the buffer pointers for external data unit memory 210 may be stored in free-list 222 (when the corresponding buffers are available) or scheduler queues 224 (when the corresponding buffers store data units). Each queue, in scheduler queues 224, may correspond to a different data unit destination, a different priority, a different level of service, etc. For example, scheduler queues 224 may include a different set of queues for each different destination from network device 100. Within each set of queues may be queues for different priorities, different levels of service, etc. Each queue, in scheduler queues 224, may include entries that are wide enough to at least store a buffer pointer (e.g., 20 bits), but may be wide enough to also store additional information.

Although FIG. 2 shows exemplary components of the off-chip portion of portion 200 of network device, in other embodiments, the off-chip portion may include fewer, different, differently arranged, or additional components than depicted in FIG. 2. In some embodiments, one or more components of the off-chip portion may perform one or more other tasks described as being performed by one or more other components of the off-chip portion.

The on-chip portion, of portion 200 of network device 100, may include a controller 230, a buffer controller 240, and a scheduler interface 250. Controller 230 may control the buffer pointers in portion 200. Controller 230 may include an off-chip memory controller 232, a prefetch buffer 234, free-list control logic 236, and a multiplexer (MUX) 238. Off-chip memory controller 232 may interface with external pointer memory 220 to read and write buffer pointers to free-list 222 and scheduler queues 224. For example, off-chip memory controller 232 may receive a request for a buffer pointer from free-list control logic 236 and may retrieve a buffer pointer from free-list 222 in response thereto. Additionally, off-chip memory controller 232 may receive a request for a buffer pointer from scheduler interface 250 and may retrieve a buffer pointer from an appropriate one of scheduler queues 224 in response thereto. In addition, off-chip memory controller 232 may receive a request, from free-list control logic 236, to store a buffer pointer to free-list 222 and may write the buffer pointer to free-list 222 in response thereto. Additionally, off-chip memory controller 232 may receive a request, from scheduler interface 250, to store a buffer pointer in a particular queue of scheduler queues 224 and may write the buffer pointer to the particular queue, in scheduler queues 224, in response thereto.

Prefetch buffer 234 may store buffer pointers for buffers, in external data unit memory 210, that are available for storing data units. In one embodiment, prefetch buffer 234 may store buffer pointers in a list in a first-in, first-out (FIFO) manner. Thus, buffer pointers may be read out of prefetch buffer 234 in the same order that the buffer pointers are stored in prefetch buffer 234. Other manners of storing the buffer pointers in prefetch buffer 234 may alternatively be used.

Free-list control logic 236 may manage available buffer pointers (i.e., buffer pointers that point to buffers, in external data unit memory, that are available to store data units). For example, free-list control logic 236 may determine when buffer pointers are to be retrieved from free-list 222 and returned to free-list 222. For example, during an initialization period, free-list control logic 236 may retrieve a group of buffer pointers from free-list 222 and store the retrieved buffer pointers in prefetch buffer 234. Free-list control logic 236 may also receive buffer pointers from buffer controller 240 (and/or other components within network device 100, such as Weighted Random Early Detection (WRED) drop logic) and determine (e.g., when prefetch buffer 234 is full) that the buffer pointers are to be returned to free-list 222. Free-list control logic 236 may also determine when buffer pointers are to be stored to prefetch buffer 234. For example, as indicated above, free-list control logic 236 may store a group of buffer pointers in prefetch buffer 234 during, for example, an initialization period. Free-list control logic 236 may also recycle buffer pointers, received from buffer controller 240, by storing the buffer pointers in prefetch buffer 234 when, for example, free-list control logic 236 determines that prefetch buffer 234 is not full.

Multiplexer 238 may receive buffer pointers from off-chip memory controller 232 and free-list control logic 236 and forward the buffer pointers to prefetch buffer 234 for storage.

Although FIG. 2 shows exemplary components of controller 230, in other embodiments, controller 230 may include fewer, different, differently arranged, or additional components than depicted in FIG. 2. For example, controller 230 may also include head and tail pointers for free-list 222 that point to the beginning and end, respectively, of free-list 222 and scheduler interface 250 (or possibly controller 230) may include head and tail pointers for scheduler queues 224 that point to the beginning and end, respectively, of each scheduler queue 224. In some embodiments, one or more components of controller 230 may perform one or more other tasks described as being performed by one or more other components of controller 230.

Buffer controller 240 may write data units to external data unit memory 210 and read data units from external data unit memory 210. Buffer controller 240 may perform these writing and reading operations using buffer pointers. For example, buffer controller 240 may read a buffer pointer from prefetch buffer 234 and use the buffer pointer to store a data unit in external data unit memory 210. In addition, buffer controller 240 may receive a buffer pointer from scheduler interface 250 and use the buffer pointer to read a data unit from external data unit memory 210. Once a data unit is read from external data unit memory, buffer controller 240 may return the buffer pointer to free-list control logic 236, which decides whether to recycle the buffer pointer (by storing the buffer pointer in prefetch buffer 234) or return the buffer pointer to free-list 222.

Scheduler interface 250 may manage the buffer pointers in scheduler queues 224. For example, for a data unit that has been stored in external data unit memory 210, scheduler interface 250 may determine that the buffer pointer for that particular data unit is to be stored in a particular queue of scheduler queues 224. Scheduler interface 250 may indicate, to off-chip memory controller 232, that the buffer pointer is to be stored in the particular queue. When scheduler interface 250 determines that the data unit is ready to be transmitted, scheduler interface 250 may cause the buffer pointer for that data unit to be dequeued from the particular queue and send that buffer pointer to buffer controller 240 to allow the data unit to be read from external data unit memory 210.

Although FIG. 2 shows exemplary components of the on-chip portion of portion 200 of network device, in other embodiments, the on-chip portion may include fewer, different, differently arranged, or additional components than depicted in FIG. 2. In some embodiments, one or more components of the on-chip portion may perform one or more other tasks described as being performed by one or more other components of the on-chip portion.

Exemplary Processes

Figure 3:
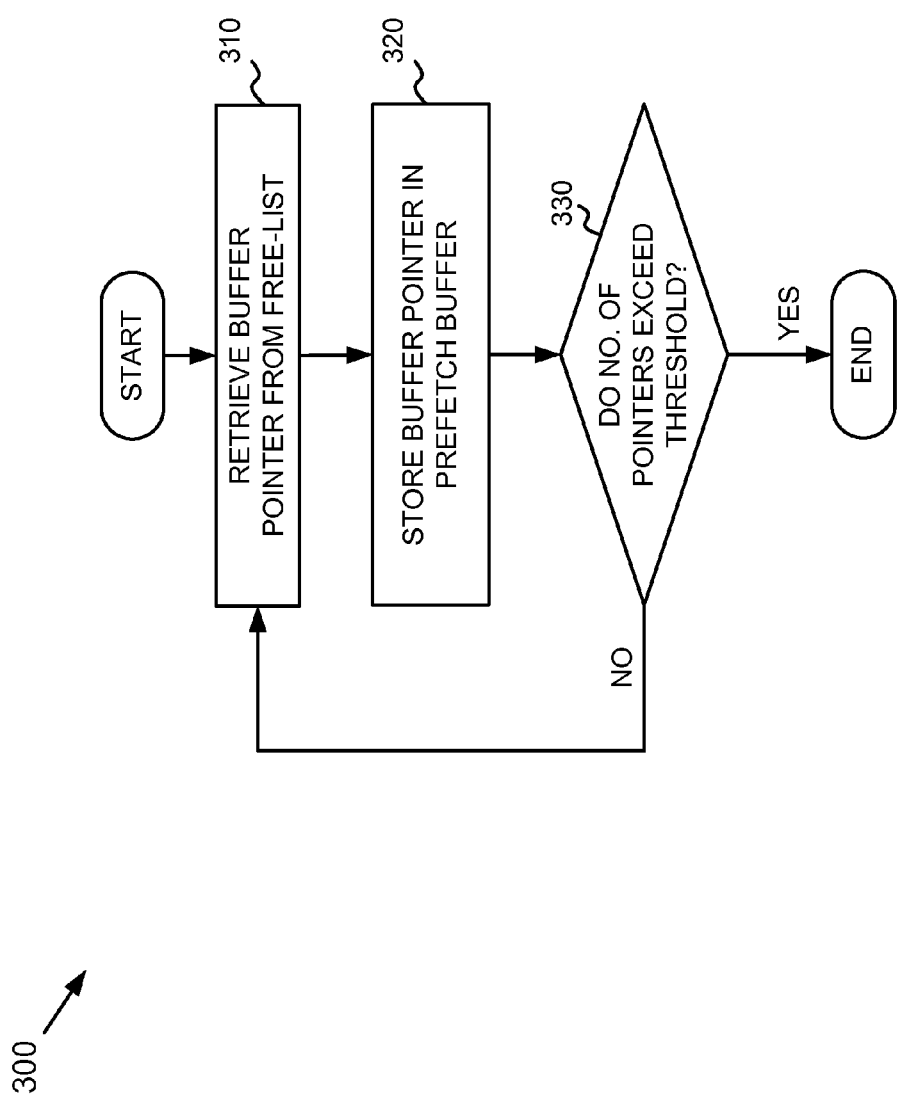
FIG. 3 is a flowchart of an exemplary process for initializing the prefetch buffer of FIG. 2.

FIG. 3 is a flowchart of an exemplary process 300 for initializing prefetch buffer 234. In one embodiment, process 300 may be performed by network device 100. In another embodiment, some or all of process 300 may be performed by another device or group of devices, including or excluding network device 100.

Assume, for explanatory purposes, that prefetch buffer 234 does not store any buffer pointers. As illustrated in FIG. 3, process 300 may include retrieving a buffer pointer from free-list 222 (block 310). For example, free-list control logic 236 may send a command to off-chip memory controller 232 that causes the first entry of free-list to be read from free-list 222.

Process 300 may further include storing the buffer pointer in prefetch buffer 234 (block 320). For example, off-chip memory controller 232 may forward the read buffer pointer to multiplexer 238, which forwards the buffer pointer to prefetch buffer 234 for storage. Since prefetch buffer 234 did not previously store any buffer pointers, the buffer pointer in the first entry of free-list 222 may be stored at the head of prefetch buffer 234.

Process 300 may further include determining whether the number of buffer pointers in prefetch buffer 234 exceeds a threshold (block 330). During the initialization of prefetch buffer 234, free-list control logic 236 may, for example, only fill prefetch buffer 234 to some determined percentage (i.e., threshold) of prefetch buffer's overall capacity, to allow for buffer pointers, returned from buffer controller 240, to be recycled, by storing the buffer pointers in prefetch buffer 234, instead of returning the buffer pointers to free-list 222. In one embodiment, the determined percentage may be fifty (50) percent.

If the number of buffer pointers in prefetch buffer 234 exceeds the threshold (block 330—YES), process 300 may end. If, on the other hand, the number of buffer pointers in prefetch buffer 234 does not exceed the threshold (block 330—NO), process 300 may return to block 310 with free-list control logic 236 retrieving the next entry from free-list 222.

Figure 4:
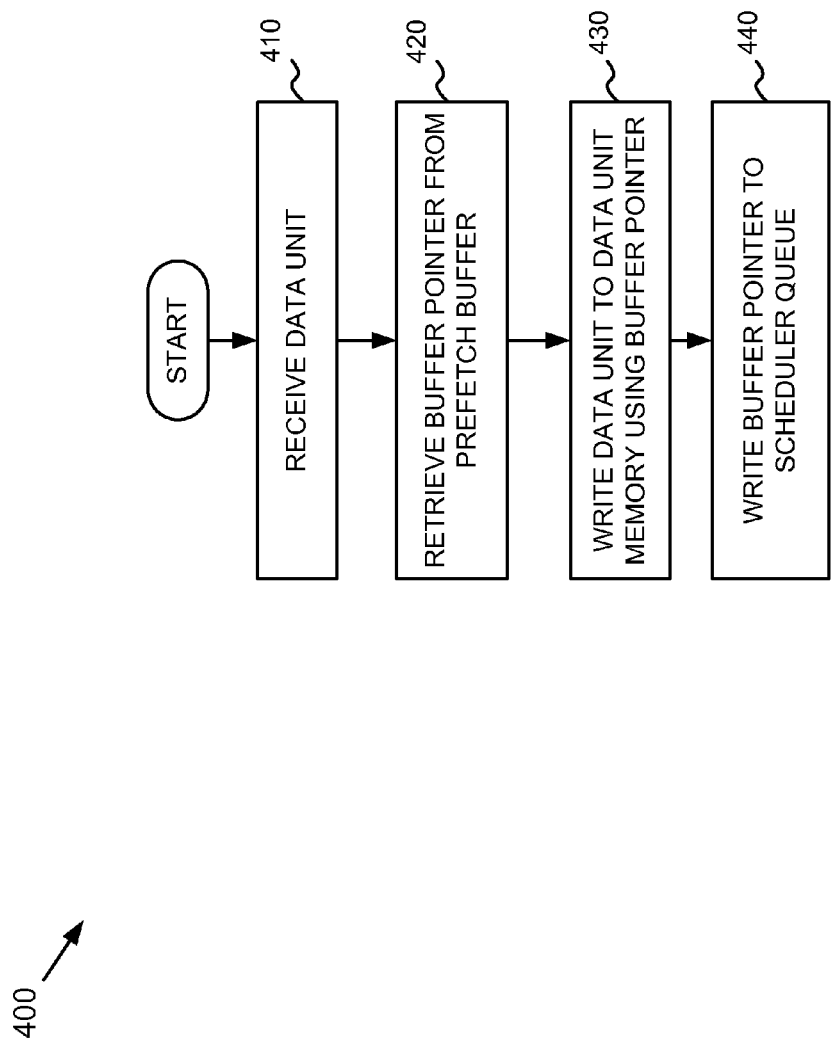
FIG. 4 is a flowchart of an exemplary process for handling buffer pointers when data units are received.

FIG. 4 is a flowchart of an exemplary process 400 for handling buffer pointers when data units are received. In one embodiment, process 400 may be performed by network device 100. In another embodiment, some or all of process 400 may be performed by another device or group of devices, including or excluding network device 100.

As illustrated in FIG. 4, process 400 may include receiving a data unit (block 410). For example, buffer controller 240 may receive a data unit from a physical link to which network device 100 connects or from another component within network device 100.

Process 400 may further include retrieving a buffer pointer from prefetch buffer 234 (block 420). For example, buffer controller 240 may retrieve a buffer pointer, from the head of prefetch buffer 234, for use in storing the data unit. It will be appreciated that buffer controller 240 may retrieve more than one buffer pointer from prefetch buffer 234 for a particular data unit. For example, if the buffers in external data unit memory 210 are "128" bytes and the data unit to be stored is "160" bytes, then buffer controller 240 may retrieve two buffer pointers from prefetch buffer 234. Thus, by allocating a buffer pointer from prefetch buffer 234, a read operation to free-list 222 in external pointer memory 220 can be avoided.

Process 400 may further include writing the data unit to external data unit memory 210 using the retrieved buffer pointer (block 430). For example, buffer controller 240 may write the data unit to a location in external data unit memory 210 to which the buffer pointer points.

Process 400 may also include writing the buffer pointer to a queue in scheduler queues 224 (block 440). For example, buffer controller 240 may transfer the buffer pointer to scheduler interface 250, where an appropriate queue, in scheduler queues 224, may be identified for storing the buffer pointer. Scheduler interface 250 may enqueue the buffer pointer in the identified queue of scheduler queues 224. For example, scheduler interface 250 may send the buffer pointer to off-chip memory controller 232 and off-chip memory controller 232 may link the buffer pointer to the appropriate queue in external pointer memory 220 via a write operation.

Figure 5:
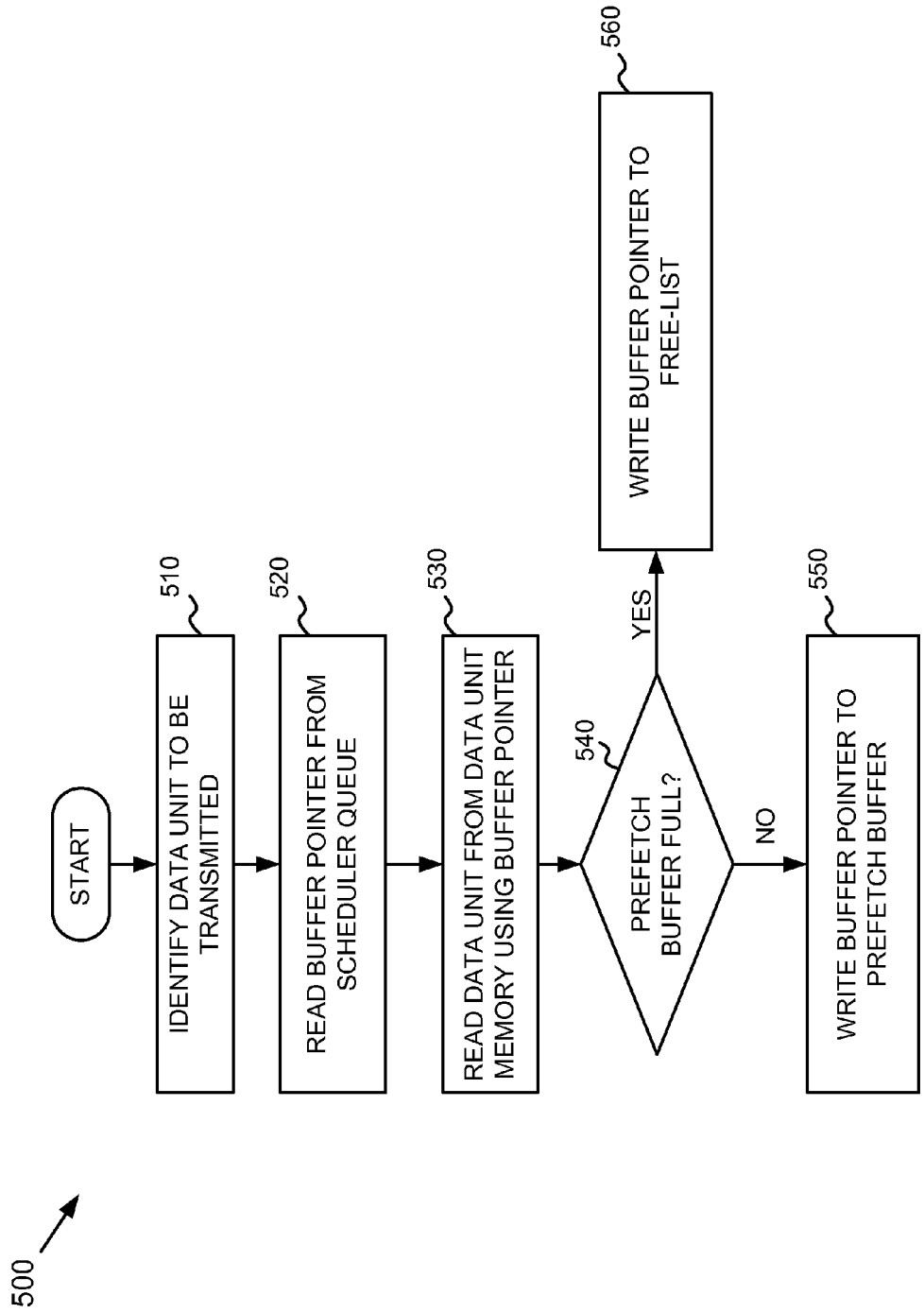
FIG. 5 is a flowchart of an exemplary process for handling buffer pointers when data units are transmitted.

FIG. 5 is a flowchart of an exemplary process 500 for handling buffer pointers when data units are to be transmitted. In one embodiment, process 500 may be performed by network device 100. In another embodiment, some or all of process 500 may be performed by another device or group of devices, including or excluding network device 100.

As illustrated in FIG. 5, process 500 may include identifying a data unit to be transmitted (block 510). For example, scheduler interface 250 may identify a data unit, stored in external data unit memory 210, that is to be transmitted either on a physical link by network device 100 or to another component within network device 100. Scheduler interface 250 may identify an appropriate data unit based, for example, on one or more rules used by network device 100 for routing data units.

Process 500 may further include reading a buffer pointer from the particular queue of scheduler queues 224 (block 520). For example, scheduler interface 250 may cause off-chip memory controller 232 to dequeue the buffer pointer from the particular queue in external pointer memory 220, via a read operation, and may return the buffer pointer to scheduler interface 250. Scheduler interface 250 may transfer the buffer pointer to buffer controller 240.

Process 500 may also include reading the data unit from external data unit memory 210 using the buffer pointer (block 530). For example, buffer controller 240 may use the buffer pointer to retrieve the data unit that is stored in the buffer, of external data unit memory 210, to which the buffer pointer points. Buffer controller 240 may return the buffer pointer to free-list control logic 236.

Process 500 may include determining whether prefetch buffer 234 is full (block 540). The determination of whether prefetch buffer 234 is full may include determining whether any additional buffer pointers can be stored in prefetch buffer 234. Alternatively, the determination may include determining whether the quantity of buffer pointers, stored in prefetch buffer 234, equals or exceeds a threshold.

When prefetch buffer 234 is determined not to be full (block 540—NO), free-list control logic 236 may return the buffer pointer to prefetch buffer 234 (block 550). For example, free-list control logic 236 may append the buffer pointer to the end of the list of buffer pointers in prefetch buffer 234. Thus, in those situations where prefetch buffer 234 is not full, a write operation to external pointer memory 220 may be avoided.

When prefetch buffer 234 is determined to be full (block 540—YES), free-list control logic 236 may return the buffer pointer to free-list 222 in external pointer memory 220 (block 560). For example, free-list control logic 236 may transfer the buffer pointer to off-chip memory controller 232. Off-chip memory controller 232 may write the buffer pointer to a location in free-list 222 (e.g., off-chip memory controller 232 may append the buffer pointer to the end of free-list 222). Thus, in those situations where prefetch buffer 234 is full, a write operation to external pointer memory 220 may be needed.

The following example 600 of FIGS. 6A-6C illustrates the processes described above with respect to FIGS. 4 and 5. Assume, for the purposes of example 600, that prefetch buffer 234 has been initialized and includes a number of buffer pointers from free-list 222. Assume further, that buffer controller 240 receives a data unit (called "DATA UNIT A"). In response, buffer controller 240 may retrieve a buffer pointer from prefetch buffer 234 (referred to as "POINTER 1" in FIG. 6A) (block 605). This retrieval operation does not include a read to external pointer memory 220. Assume that POINTER 1 points to buffer 1 in external data unit memory 210 (not shown).

Buffer controller 240 may store DATA UNIT A in location 1 of external data unit memory 210 and transfer POINTER 1 to scheduler interface 250 (block 610), as illustrated in FIG. 6A. Scheduler interface 250 may identify an appropriate queue, in scheduler queues 224, in which POINTER 1 is to be stored. Scheduler interface 250 may transfer POINTER 1 to off-chip memory controller 232 (block 615). Off-chip memory controller 232 may link POINTER 1 to the appropriate scheduler queue 224 in external pointer memory 220, via a write operation (block 620). Thus, this writing operation includes a write to external pointer memory 220.

Assume that, at some later point in time, scheduler interface 250 determines that DATA UNIT A is ready to be transmitted. Thus, scheduler interface 250 may indicate to off-chip memory controller 232 that a buffer pointer is to be read from the queue of scheduler queues 224. Off-chip memory controller 232 may retrieve POINTER 1 from the queue in external pointer memory 220, via a read operation (block 625), and transfer POINTER 1 to scheduler interface 250 (block 630), as illustrated in FIG. 6B. Scheduler interface 250 may transfer POINTER 1 to buffer controller 240 (block 635). Buffer controller 240 may use POINTER 1 to retrieve DATA UNIT A from external data unit memory 210 (not shown). After retrieving DATA UNIT A, buffer controller 240 may transfer POINTER 1 to free-list control logic 236 (block 640). Assume, with respect to FIG. 6B, that free-list control logic 236 determines that prefetch buffer 234 is not full. Free-list control logic 236 may forward POINTER 1 to multiplexer 238 (block 645), which then forwards POINTER 1 to prefetch buffer 234 for storage (block 650). Thus, the processing of DATA UNIT A involved one write operation to external pointer memory 220 (i.e., the writing of POINTER 1 to a queue of scheduler queues 224) and one read operation to external pointer memory 220 (i.e., the reading of POINTER 1 from the queue of scheduler queues 224).

Assume now, with respect to FIG. 6C, that free-list control logic 236 determines that prefetch buffer 234 is full. In this situation, free-list control logic 236 may forward POINTER 1 to off-chip memory controller 232 (block 655). Off-chip memory controller 232 may return POINTER 1 to free-list 222 (block 660).

CONCLUSION

Systems and/or methods described herein may manage buffer pointer lists in network devices. In one embodiment, an on-chip prefetch buffer may be provided that allows for recycling of buffer pointers. Thus, when a buffer pointer is to be returned, instead of writing the buffer pointer back to the free-list in the off-chip memory, the buffer pointer may be stored in the on-chip prefetch buffer and used for a subsequently received data unit. By eliminating the retrieval and return of buffer pointers to the off-chip memory, the bandwidth requirement to the off-chip memory can be reduced. Additionally or alternatively, additional enqueue and/or dequeue operations may be performed in an epoch.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 3-5 and with regard to example 600 in FIGS. 6A-6C, the order of the blocks may be modified in other implementations. Further, non-dependent blocks may be performed in parallel.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A network device comprising:
   an off-chip memory to store a free-list of buffer pointers; and
   an on-chip controller that includes a prefetch buffer, the prefetch buffer being to store unallocated buffer pointers that point to available memory locations, the on-chip controller to:
   retrieve a first unallocated buffer pointer from the free-list,
   store the first unallocated buffer pointer in the prefetch buffer to obtain a quantity of unallocated buffer pointers in the prefetch buffer,
   determine, in response to storing the first unallocated buffer point in the prefetch buffer, whether the quantity of unallocated buffer pointers in the prefetch buffer exceeds a threshold,
   receive, when the quantity of unallocated buffer pointers in the prefetch buffer is determined to not exceed the threshold, a second unallocated buffer pointer from the off-chip memory,
   determine, in response to receiving the second unallocated buffer pointer, whether the prefetch buffer is full,
   store the second unallocated buffer pointer in the prefetch buffer when the prefetch buffer is determined not to be full, and
   store the second unallocated buffer pointer in the free-list, in the off-chip memory, when the prefetch buffer is determined to be full.

2. The network device of claim 1, where the off-chip memory further includes:
   one or more scheduler queues to:
      store allocated buffer pointers that point to unavailable memory locations in a different off-chip memory.

3. The network device of claim 2, further comprising:
   a scheduler interface to:
      enqueue allocated buffer pointers to the one or more scheduler queues, and
      dequeue allocated buffer pointers from the one or more scheduler queues.

4. The network device of claim 3, where the scheduler interface is further to:
   perform a first enqueue operation in one epoch,
   perform a first dequeue operation in the one epoch, and
   provide an ability to perform at least one of a second enqueue operation or a second dequeue operation in the one epoch.

5. The network device of claim 1, where, when determining whether the prefetch buffer is full, the on-chip controller is to:

determine whether a number of unallocated buffer pointers stored in the prefetch buffer exceeds the threshold.

6. The network device of claim 1, where the on-chip controller is further to:
retrieve, when the quantity of unallocated buffer pointers in the prefetch buffer is determined to not exceed the threshold, a next unallocated buffer pointer from the free-list, the next unallocated buffer pointer being different than the first unallocated buffer pointer and being different than the second unallocated buffer pointer,
store the next unallocated buffer pointer in the prefetch buffer to obtain an updated quantity of unallocated buffer pointers in the prefetch buffer,
determine, in response to storing the next unallocated buffer pointer in the prefetch buffer, whether the updated quantity of unallocated buffer pointers in the prefetch buffer exceeds the threshold, and
re-perform, when the updated quantity of unallocated buffer pointers in the prefetch buffer is determined to not exceed the threshold, the retrieving a next unallocated buffer pointer from the free-list, the storing the next unallocated buffer pointer in the prefetch buffer, and the determining whether the updated quantity of unallocated buffer pointers in the prefetch buffer exceeds the threshold until the updated quantity of unallocated buffer pointers in the prefetch buffer is determined to exceed the threshold.

7. The network device of claim 1, where the prefetch buffer is implemented as a first-in, first-out buffer.

8. The network device of claim 1, where the network device comprises a router.

9. A method for managing buffer pointers that point to locations in an off-chip memory, the off-chip memory storing data units, the method comprising:
retrieving, by a controller in an on-chip memory, a first buffer pointer from a free-list of unallocated buffer pointers in an off-chip buffer pointer memory;
storing, by the controller, the first buffer pointer in the on-chip prefetch buffer to obtain a quantity of buffer pointers in the on-chip prefetch buffer;
determining, by the controller and in response to the storing the first buffer point in the on-chip prefetch buffer, whether the quantity of buffer pointers in the on-chip prefetch buffer exceeds a threshold;
receiving, by the controller and when the quantity of buffer pointers in the on-chip prefetch buffer is determined to not exceed the threshold, a second buffer pointer from the off-chip memory;
determining, by the controller and in response to receiving the second buffer pointer, whether the on-chip prefetch buffer is full, the on-chip prefetch buffer being to store buffer pointers;
storing, by the controller, the second buffer pointer in the on-chip prefetch buffer when the on-chip prefetch buffer is determined not to be full; and
storing, by the controller, the second buffer pointer in an off-chip buffer pointer memory when the on-chip prefetch buffer is determined to be full.

10. The method of claim 9, further comprising:
storing allocated buffer pointers, which point to unavailable memory locations in the off-chip memory, in the off-chip buffer pointer memory.

11. The method of claim 10, where the storing allocated buffer pointers includes:
enqueuing an allocated buffer pointer to a scheduler queue, and
dequeuing the allocated buffer pointer from the scheduler queue.

12. The method of claim 10, where the storing allocated buffer pointers includes:
performing a first enqueue operation in one epoch,
performing a first dequeue operation in the one epoch, and
providing an ability to perform at least one of a second enqueue operation or a second dequeue operation in the one epoch.

13. The method of claim 9, where the determining whether the on-chip prefetch buffer is full includes:
determining whether a quantity of buffer pointers stored in the on-chip prefetch buffer exceeds the threshold.

14. The method of claim 9, where the storing the second buffer pointer in the off-chip buffer pointer memory includes:
storing the second buffer pointer in a free-list of unallocated buffer pointers in the off-chip buffer pointer memory.

15. The method of claim 14, further comprising:
retrieving, when the quantity of buffer pointers in the on-chip prefetch buffer is determined to not exceed the threshold, a next buffer pointer from the free-list, the next buffer pointer being different than the first buffer pointer and different than the second buffer pointer;
storing the next buffer pointer in the on-chip prefetch buffer to obtain an updated quantity of buffer pointers in the on-chip prefetch buffer;
determining, in response to the storing the next buffer point in the on-chip prefetch buffer, whether the updated quantity of buffer pointers in the on-chip prefetch buffer exceeds the threshold; and
re-performing, when the updated quantity of buffer pointers in the on-chip prefetch buffer is determined to not exceed the threshold, the retrieving a next buffer pointer from the free-list, the storing the next buffer pointer in the on-chip prefetch buffer, and the determining whether the updated quantity of buffer pointers in the on-chip prefetch buffer exceeds the threshold until the updated quantity of buffer pointers in the on-chip prefetch buffer is determined to exceed the threshold.

16. The method of claim 9, where the on-chip prefetch buffer is implemented as a first-in, first-out buffer.

17. A network device comprising:
an off-chip memory; and
an on-chip controller that includes a prefetch buffer to store unallocated buffer pointers that point to available memory locations, the on-chip controller to:
retrieve a first buffer pointer from the off-chip memory;
store the first buffer pointer in the prefetch buffer to obtain a quantity of buffer pointers in the prefetch buffer;
determine, in response to storing the first buffer point in the prefetch buffer, whether the quantity of buffer pointers in the prefetch buffer exceeds a threshold;
receive, when the quantity of buffer pointers in the prefetch buffer is determined to not exceed the threshold, a second buffer pointer, from the off-chip memory, that points to an available location in the off-chip memory,
determine, in response to receiving the second buffer pointer, whether the prefetch buffer is full,
store the second buffer pointer in the prefetch buffer when the prefetch buffer is determined not to be full, and
store the second buffer pointer in an off-chip memory when the prefetch buffer is determined to be full.

18. The device of claim 17, where the on-chip controller is further to:

retrieve, when the quantity of buffer pointers in the prefetch buffer is determined to not exceed the threshold, a next buffer pointer from the off-chip memory, the next buffer pointer being different than the first buffer pointer and different than the second buffer pointer;

store the next buffer pointer in the prefetch buffer to obtain an updated quantity of buffer pointers in the prefetch buffer;

determine, in response to storing the next buffer point in the prefetch buffer, whether the updated quantity of buffer pointers in the prefetch buffer exceeds the threshold; and re-implement, when the updated quantity of buffer pointers in the prefetch buffer is determined to not exceed the threshold, retrieving a next buffer pointer from the off-chip memory, storing the next buffer pointer in the prefetch buffer, and determining whether the updated quantity of buffer pointers in the prefetch buffer exceeds the threshold until the updated quantity of buffer pointers in the prefetch buffer is determined to exceed the threshold.

19. The device of claim 17, where the off-chip memory stores:

a plurality of scheduler queues to:
store buffer pointers that point to unavailable locations in the off-chip memory, and where the on-chip controller is further to:
enqueue the first buffer pointer to a first scheduler queue, of the plurality of scheduler queues, in one epoch;
dequeue the second buffer pointer to a second scheduler queue, of the plurality of scheduler queues, in the one epoch, and
enqueue a third buffer pointer to a third scheduler queue, of the plurality of scheduler queues, or dequeue a fourth buffer pointer to a fourth scheduler queue, of the plurality of scheduler queues, in the one epoch.

20. The device of claim 17, where the prefetch buffer is implemented as a first-in, first-out buffer.

* * * * *